United States Patent
Iannazzi

(10) Patent No.: US 7,310,107 B2
(45) Date of Patent: Dec. 18, 2007

(54) METHOD FOR MONITORING IMAGE CALIBRATION

(75) Inventor: Craig Iannazzi, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 455 days.

(21) Appl. No.: 11/086,879

(22) Filed: Mar. 22, 2005

(65) Prior Publication Data

US 2006/0214973 A1    Sep. 28, 2006

(51) Int. Cl.
 *B41J 2/47* (2006.01)
(52) U.S. Cl. ............................ 347/240; 347/251
(58) Field of Classification Search .............. 347/131, 347/195–196, 240, 251–254; 355/40; 358/19
See application file for complete search history.

(56) References Cited

U.S. PATENT DOCUMENTS

| | | | |
|---|---|---|---|
| 5,268,708 A | 12/1993 | Harshbarger et al. | |
| 5,428,371 A | 6/1995 | Fox et al. | |
| 6,297,873 B1 * | 10/2001 | Furuya | ............. 355/40 |
| 2003/0020703 A1 | 1/2003 | Holub | |
| 2004/0012817 A1 | 1/2004 | Brewington et al. | |
| 2004/0114165 A1 * | 6/2004 | Nakajima | ............ 358/1.9 |
| 2004/0184051 A1 | 9/2004 | Bailey | |
| 2004/0212816 A1 * | 10/2004 | Tanabe et al. | ......... 358/1.9 |

FOREIGN PATENT DOCUMENTS

| | | |
|---|---|---|
| DE | 102 16 669 | 4/2002 |
| EP | 0 741 491 | 11/1996 |
| EP | 0 747 853 | 12/1996 |
| EP | 1 262 749 | 12/2002 |
| EP | 1 401 192 | 3/2004 |

* cited by examiner

*Primary Examiner*—Hai Pham
(74) *Attorney, Agent, or Firm*—Nelson Adrian Blish

(57) ABSTRACT

A method for monitoring and adjusting the calibration for an image processing apparatus entails imaging a calibration target to create an image using the image processing apparatus and scanning the image into host software to create an exposure calibration curve. Control strips are imaged to create control strip images on order to obtain a calibrated density history for the control strips using the control strip images. The control strip images are scanned into the host software to obtain a scanned density history for each control strip and thereby form a density history for the control strips. A deviation history is calculated by comparing the scanned density history to the calibrated density history for each control strip. The deviation history is monitored to ensure that the deviation history is within the operating specifications for the image processing apparatus.

16 Claims, 4 Drawing Sheets

METHOD FOR MONITORING IMAGE CALIBRATION

FIELD OF THE INVENTION

The present embodiments relate to methods for monitoring the calibration for an image processing apparatus, in particular, for laser printers, ink jet printers, offset printers and the like.

BACKGROUND OF THE INVENTION

Image processing apparatus comes in many varieties, including equipment depicted in commonly assigned U.S. Pat. No. 5,428,371, which is an image processing apparatus having half-tone color proofing capabilities. In this patent, the image processing apparatus is arranged to form an intended image on a sheet of thermal print media by transferring dye from a sheet of dye donor material to a thermal print media by applying thermal energy to the dye donor material to transfer dye to the thermal print media, thereby forming an intended image. Such image processing apparatus is made of a material supply assembly, a lathe bed scanning subsystem which includes a lathe bed scanning frame, translation drive, translation state member, printhead, and vacuum imaging drum, thermal print media and dye donor material exit transports.

The operation of the image processing apparatus comprises feeding a sheet of thermal media from the media roll to the vacuum drum, partially wrapped around the drum, cut to length, then wrapped fully around the drum. A length of dye donor from a roll form is similarly transported to the drum, partially wrapped around the drum, cut to a desired length, then fully wrapped around the vacuum drum. The dye donor material is wrapped around the vacuum imaging drum, such that it is superposed in registration with the thermal print media. The translation drive, part of the scanning subsystem, traverses the printhead and translation stage member axially along the vacuum imaging drum in coordinated motion with the rotating vacuum imaging drum to produce the intended image on the thermal print media.

The printhead includes a plurality of laser diodes that are coupled to the printhead by fiber optic cables that can be individually modulated to supply energy to selected areas of the donor in accordance with an information signal. The printhead includes a plurality of optical fibers coupled to the laser diodes at one end and at the other end to a fiber optic array within the printhead. The printhead moves relative to the longitudinal axis of the vacuum imaging drum and dye is transferred to the thermal print media as the radiation, transferred from the laser diodes by the optical fibers to the printhead to the dye donor material, is converted to thermal energy in the dye donor material.

Color variation is typically a result of variation of the individual color density used to define the desired color. There are many factors that influence the variation of a color in a proof. Factors include but are not limited to environment variability, density calibration technique, optical noise, thermal media coating quality, densitometer measurement noise, lamination noise, and digital proofer focus errors.

Due to factors that cause density variation, calibration of density is required to achieve high levels of consistency between a requested or desired density and the average density on an imaged proof. Calibration to the average proof density is desired due to the fluctuation of density within a single proof. To be most color accurate across the entire proof the average density should closely match the requested density.

Some early digital proofers, such as U.S. Pat. No. 5,268,708 utilized a linear calibration model over a specified density range. Specifications for the output density range were developed from printing standards. The SWOP standard was the model used for the calibration range for U.S. Pat. No. 5,268,708.

Presses are capable of producing more than cyan, magenta, yellow, and black output colors. Often special colors are added to expand the color of a print. Colors from a press are limited to the various ink colors that can be mixed or created—a virtually endless assortment. Presses therefore had a much larger color gamut than proofers, which are limited by the color gamut produced by thermal dye.

With the introduction of U.S. Pat. No. 5,428,371, color gamuts were expanded using a concept named "Recipe Color." The amount of usable density range was increased for each thermal dye donor. Multiple passes of the same bitmap used for a single color plane were imaged using different thermal dye donor material. This allowed for custom color creation, and with the introduction of a few special thermal dye donor material, the color range of a proof is extended to closely match the output of a printing press using many different inks.

A need exists for a fast calibration system with high level of accuracy that can be used in a variety of image processing systems, including laser printers, ink jet printers, fax machines, and copy machines, which can identify when the system drifts in density from a reference position, and then be restored quickly to original operating conditions.

SUMMARY OF THE INVENTION

A method for monitoring the calibration for an image processing apparatus entails imaging a calibration target on a layered assembly using the image processing apparatus to create an image, wherein the layered assembly comprises a thermal donor on a thermal receiver. The method continues by scanning the image into host software on the image processing apparatus, thereby forming an exposure calibration curve. A schedule is then formed for the calibration target such that the calibration target is automatically imaged when required combinations of preferred imaging time, image processing apparatus availability, and thermal media availability are met. Control strips are imaged using the image processing apparatus to create control strip images, wherein each control strip includes one or more calibrated density on a proof. A calibrated density history is retained for each imaged control strip.

After imaging control strips, the control strip images are scanned into the host software on the image processing apparatus to obtain a scanned density history for each control strip, thereby forming a density history for the control strips. A deviation history is calculated by comparing the scanned density history to the calibrated density history for each control strip. The deviation history is then monitored. When the deviation history is outside the operating specifications for the image processing apparatus, a course of action can be selected which is either updating a schedule for imaging the calibration target, adjusting the exposure calibration curve, or combinations of these courses of action.

An alternate method for monitoring the calibration for an image processing apparatus entails imaging a first calibration target on a layered assembly using the image processing apparatus to create an image, wherein the layered assembly comprises a thermal donor on a thermal receiver. The method continues by scanning the image into host software on the image processing apparatus to form an exposure calibration curve. A schedule is then formed for the first calibration target and a second high speed calibration target such that the calibration targets are automatically imaged when required combinations of preferred imaging time, image processing apparatus availability, and thermal media availability are met. The second calibration target contains one or more calibrated densities on a proof. A calibrated density history is retained for each second calibration target imaged.

After imaging the second calibration target, the second calibration target image is scanned into the host software on the image processing apparatus in order to obtain a scanned density history for each second calibration target. A deviation history is calculated by comparing the scanned density history to the calibrated density history for each second calibration target. The deviation history is then monitored. When the deviation history is outside the operating specifications for the image processing apparatus, a course of action can be selected to return the process to operating specifications. These courses of actions can include updating a schedule for imaging the first calibration target, updating a schedule for imaging of a second calibration target, adjusting the exposure calibration curve, or combinations of these courses of action.

The invention and its objects and advantages will become more apparent in the detailed description of the preferred embodiment presented below.

BRIEF DESCRIPTION OF THE DRAWINGS

In the detailed description of the embodiments presented below, reference is made to the accompanying drawings, in which.

The present embodiments are detailed below with reference to the listed Figures.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

The present embodiments relate to methods for calibrating an image processing apparatus.

The methods allow the user to monitor and adjust thermal media exposure calibration data using density data collected from control strips. The methods use well known statistical control chart rules applied to density deviation history to trigger when an exposure calibration curve requires modification. The time for exposure calibration modification is significantly reduced by calculating a new exposure calibration curve, scheduling a first exposure calibration target to automatically image, scheduling a second calibration target to image automatically, and combinations thereof. Scheduling a second calibration target can be performed at a high speed due to reduced patches.

Figure 1:
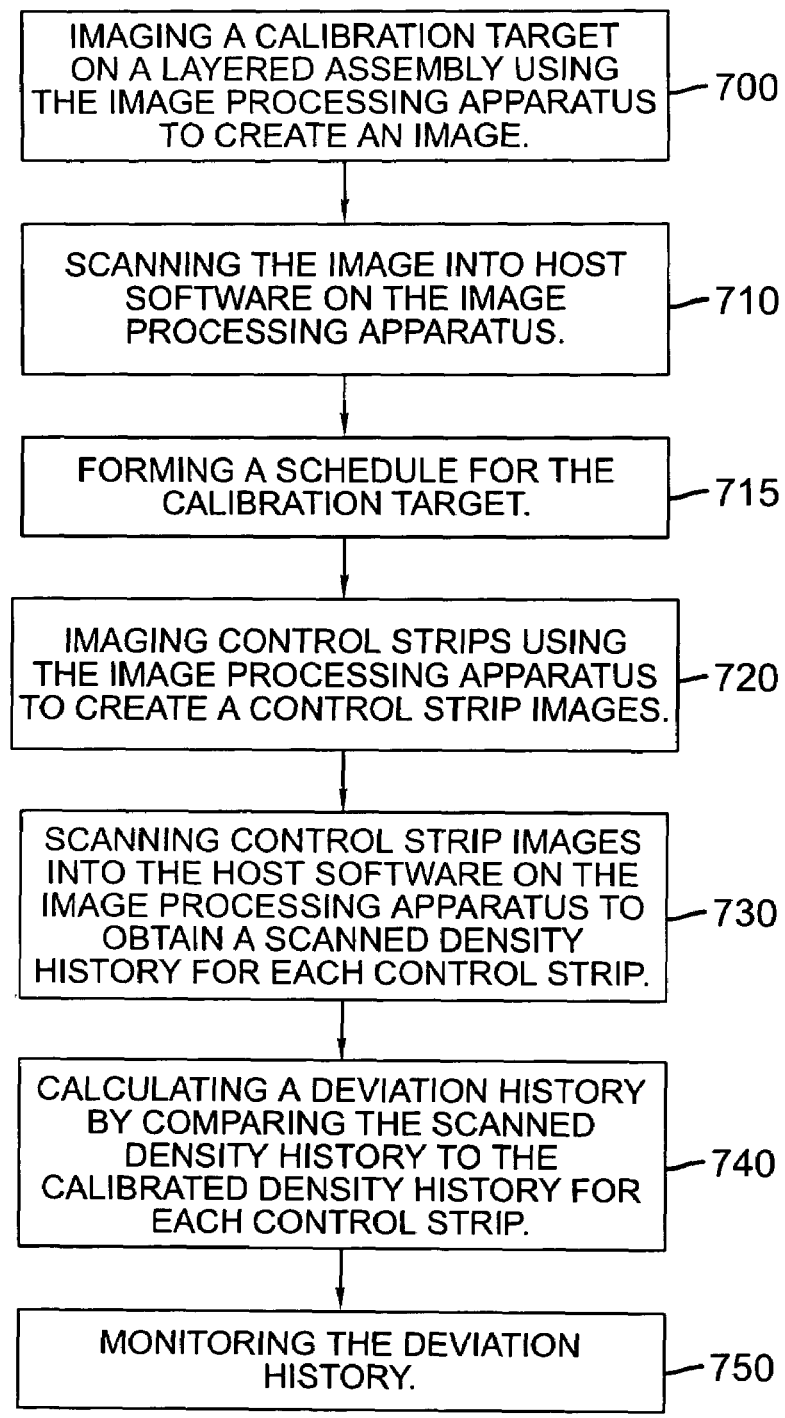
FIG. 1 is a flow diagram of an embodiment of a method for calibrating an image processing apparatus.

With reference to the figures, FIG. 1 is a flow diagram of an embodiment of a method for monitoring the calibration for an image processing apparatus. The method begins by imaging a calibration target using the image processing apparatus on a layered assembly to create an image (Step 700). The layered assembly includes a thermal donor on a thermal receiver. The calibration target includes individual exposure levels for the image processing apparatus. Imagining the calibration target can be an automated process. For example, the automated process can implement calibrations based on a predefined schedule.

The image is scanned into host software located on the image processing apparatus (Step 710). The scanned image forms an exposure calibration curve. A schedule is then formed for the calibration target (Step 715).

The method continues by imaging two or more control strips using the image processing apparatus, thereby creating a plurality of control strip images (Step 720). Each control strip has a calibrated density on a proof. The control strip may have more than one calibrated density on the proof. Each control strip can be attached to a customer's pre-press proof prior to imaging. From the control strips, a calibrated density history is retained for each imaged control strip. The calibrated density history is typically depicted as density plotted against time.

The control strip images are scanned into the host software on the image processing apparatus to obtain a scanned density history for each control strip (Step 730). The scanned density history allows a density history to be formed for the control strips. The scanned density history can be the actual density output for the image processing apparatus plotted over time.

Next, a deviation history is calculated by comparing the scanned density history to the calibrated density history for each control strip (Step 740), thereby allowing the deviation history of the image processing apparatus to be monitored (Step 750). If the deviation history is outside operating specifications for the image processing apparatus, a course of action can be taken to correct the deviation.

For example, a schedule for imaging the calibration target can be updated, or the exposure calibration curve can be adjusted, or combinations of theses actions can be performed. The schedule can include information such as dates and time for imaging the calibration target and/or an inventory of media for the image processing apparatus.

The exposure calibration curve can include a look-up table of exposure values versus density for the image processing apparatus. The exposure calibration curve can be adjusted by modifying the density history, modifying a lookup table based on the deviation history, or combinations thereof.

Alternatively, a method for monitoring the calibration for an image processing apparatus can entail forming a first schedule from imaging a first calibration target and forming a second schedule from imaging numerous second calibration targets. The schedules are created after imaging a first calibration target on a first layered assembly and scanning the first calibration image into host software on the image processing apparatus. The same process is completed for other calibration targets. The method then entails retaining a calibrated density history for each imaged second calibration target, forming a scanned density history from the second calibration images and calculating a deviation history by comparing the scanned density history to the calibrated density history. The deviation history can then be monitored in comparison to the operating specifications for the image processing apparatus.

Figure 2:
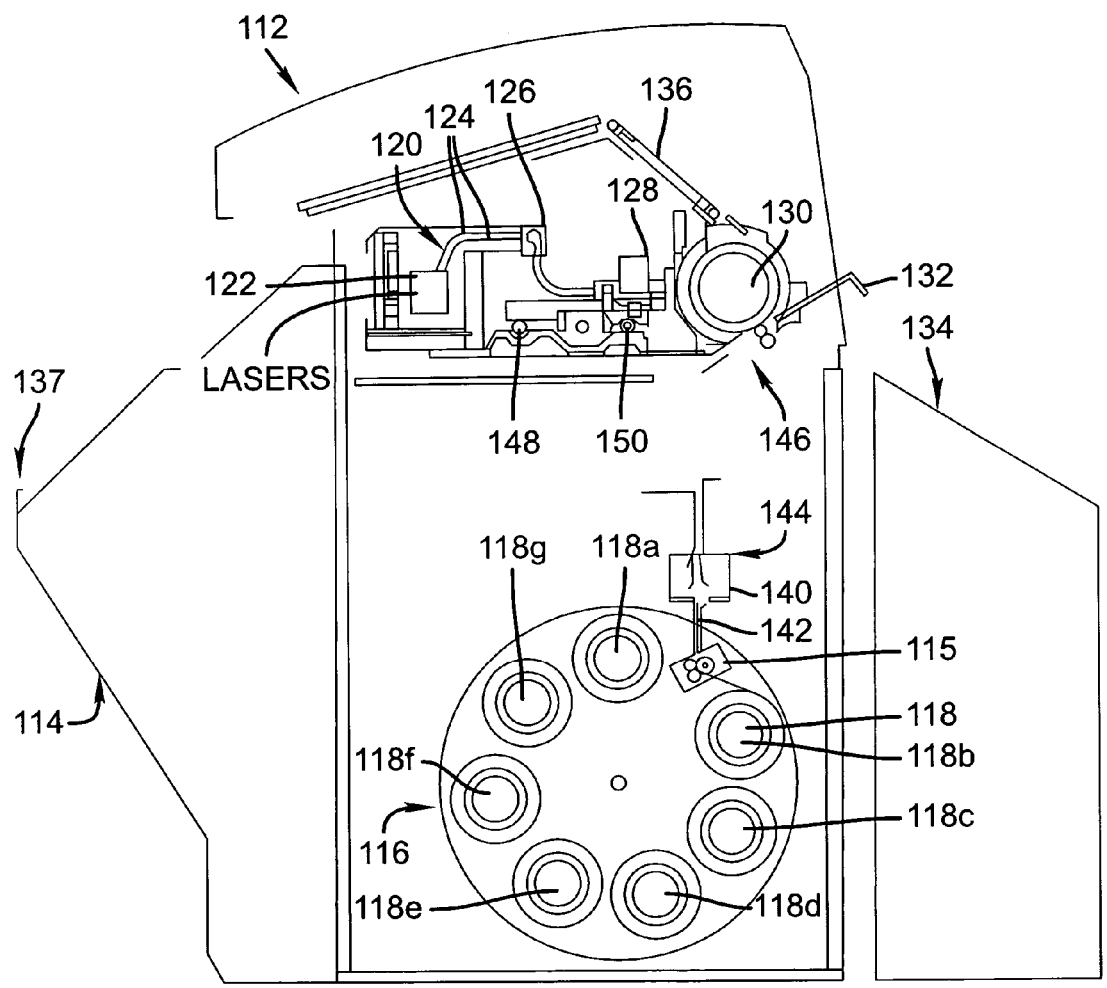
FIG. 2 examples an image processing apparatus usable with the embodied methods.

FIG. 2 illustrates an image processing apparatus usable with the embodied methods. The image processing apparatus can have an image processor housing 112 that provides a protective cover. A movable, hinged image processor door 114 is attached to the front portion of image processor housing 112 permitting access to a media carousel 116. A roll of donor roll material 118a can be connected to a media carousel 116 in a lower portion of image processor housing. Up to seven rolls of roll media can be used 118a, 118b, 118c, 118d, 118e, 118f and 118g. One roll of media 118g can be thermal print media used to receive the donor material. This thermal print media 118g can be passed to vacuum imaging drum 130 and can ultimately be cut into donor sheet material (not shown). In this regard, a media drive mechanism 115 can be attached to the thermal print media 118g, and can include three media drive rollers (not shown), through which the thermal print media of interest can be metered upwardly into a media knife assembly 144. After thermal print media reaches drum load roller 146, media drive rollers (not shown) can cease to drive the donor roll material and media knife blades 140, 142 positioned at the bottom portion of media knife assembly can be engaged to cut the thermal print media roll into thermal print media sheets. Drum load roller 146 can press the cut thermal print media against the vacuum imaging drum 130 while the vacuum imaging drum 130 slowly rotates the cut media (not shown) around vacuum imaging drum 130.

Each remaining roll of donor material can be a different color, typically black, yellow, magenta and cyan. Special colors include but are not limited to orange, green, blue, metallic, and white. These donor roll materials are passed to the vacuum imaging drum 130 and are ultimately cut into donor sheet materials (not shown) for forming the medium from which colorant imbedded therein are passed to thermal print media resting thereon, which process is described in detail below.

A media drive mechanism 115 can be attached to each roll media of donor roll material, and includes three media drive rollers (not shown) through which the donor roll material 118a, 118b, 118c, 118d, 118e of interest can be metered upwardly into a media knife assembly 144. After donor roll material reaches drum load roller 146, media drive rollers (not shown) can cease driving the donor roll material and the media knife blades 140, 142 can be positioned at the bottom portion of media knife assembly to cut the donor roll material into donor sheet materials. Drum load roller 146 can press the cut media against the vacuum imaging drum 130 while the vacuum imaging drum 130 slowly rotates the cut media (not shown) around vacuum imaging drum 130. The donor sheet material can rest atop the thermal print media (not shown) with a narrow space between the two created by microbeads embedded in the surface of the thermal print media.

A laser assembly 120 includes a quantity of laser diodes 122 in the interior. Laser diodes 122 can be connected via fiber optic cables 124 to a distribution block 126 and ultimately to printhead 128. Printhead 128 can direct thermal energy received from laser diodes 122 causing the donor sheet material to pass the desired colorant across the gap and onto the thermal print media (not shown).

In operation, vacuum imaging drum 130 can rotate at a constant velocity. Printhead 128 can begin at one end of the thermal print media and can traverse the length of the thermal print media, transferring dye for a particular donor sheet material resting on the thermal print media. After printhead 128 has completed the transfer process for the donor sheet material resting on the thermal print media, the donor sheet material can then be removed from the vacuum imaging drum 130 and transferred out of image processor housing 112 via a skive or donor ejection chute 132. The donor sheet material can eventually come to rest in a donor waste bin 134 for removal by the user. The process can then be repeated for the other desired rolls of donor roll media.

After the color from all desired sheets of the donor materials have been transferred and the donor sheet materials have been removed from vacuum imaging drum 130, the thermal print media can be removed from vacuum imaging drum 130 and transported via a transport mechanism 136 to an exit tray 137. Thermal print media can then be laminated to a paper stock using an 800XL laminator.

Figure 3:
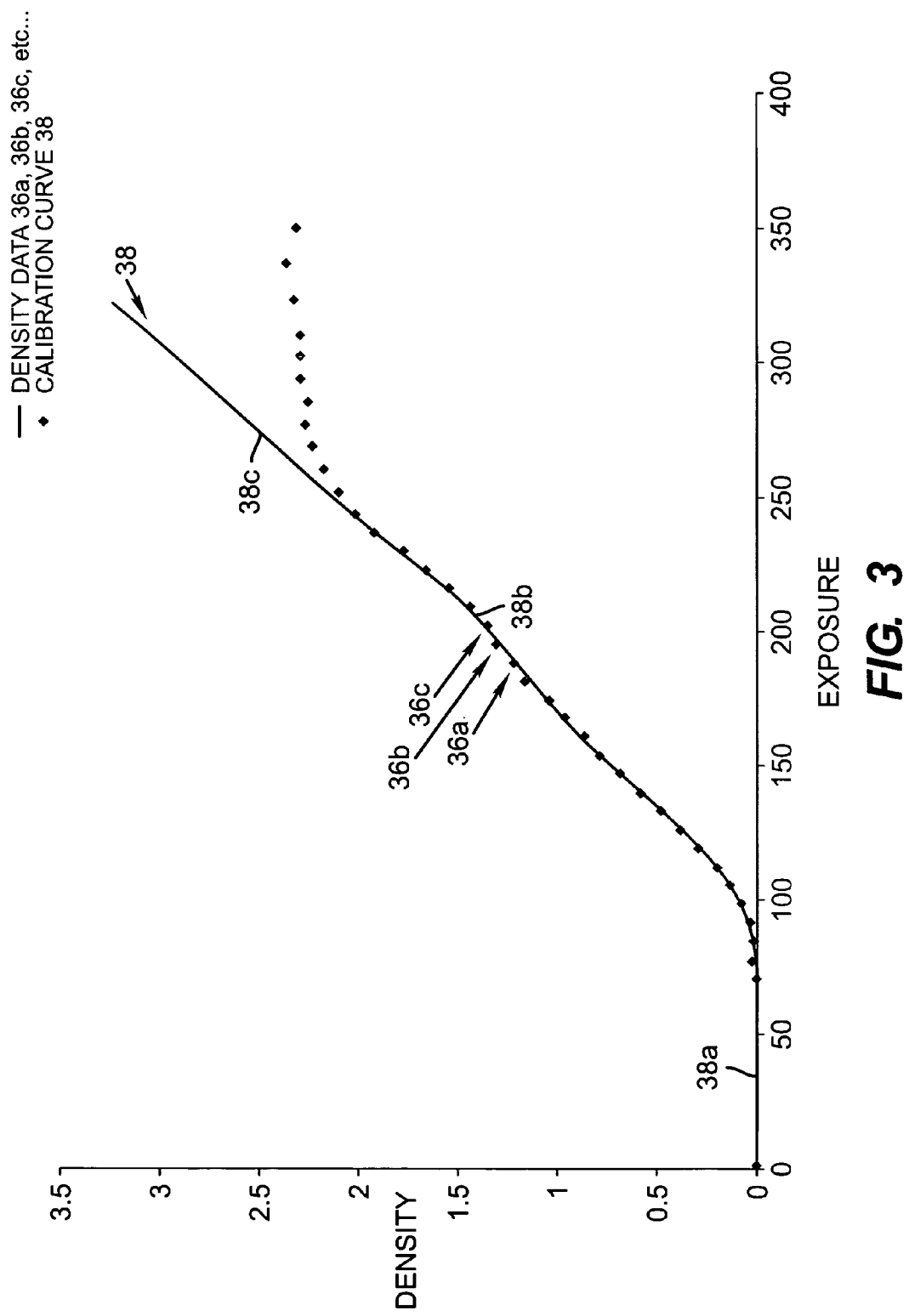
FIG. 3 shows an example of a calibration curve.

An embodiment of the calibration method entails preparing a calibration curve of exposure level versus density (Step 730 of FIG. 1). FIG. 3 shows an example of a calibration curve 38, wherein individual density values 36a, 36b, and 36c are noted. The calibration curve 38 represents a system that can have an adjustable density. Once an exposure calibration curve has been calculated, the calibration target can be scheduled to run automatically on an image processing apparatus. The schedule can be based on the thermal media availability as well as the image processing apparatus availability to minimize disruption to the user's workflow. Scheduling a future calibration process can correct for long term system drift that results from component degradation, environment changes, or combinations thereof.

The schedule can be dictated by a combination of preferred imaging times, image processing apparatus availability, and thermal media availability. Preferred imaging times refer to the preferred time of day a user of an image processing device is willing to dedicate to a calibration sequence. Image processing availability references whether or not an image processing device is busy imaging or idle. If the image processing device is busy, the schedule can delay the calibration target for a predefined amount of time. Thermal media availability refers to the amount and type of media in an image processing and the calibration status of the media. For example, the image processing device can be loaded with special colors that do not require calibration at the time a schedule dictates a calibration target to be imaged. In this case, the schedule delays the calibration target until an acceptable combination of thermal media is available.

Control strips are typically included on customer jobs for various image processing apparatus. A control strip can include solid density patches for each solid color contained in the proof. A six color press, for example, can include a control strip on an output print containing cyan, magenta, yellow, black, and two spot colors. A customer typically monitors the control strip by measuring the control strip with a spectrophotometer, such as an X-Rite 508 series spectrophotometer. A software interface can be provided to collect reflectance spectrum data for a control strip. The control strip can then be easily assigned to an output job in a finished print queue. Due to the many variations of output color possibilities for an image processing apparatus, the data collection system can be flexible so that a user can input multiple readings per color and multiple colors for an output job.

Monitoring control strip data history entails collecting control strip data over time for similar colors, creating a time based parameter plot, and checking the data history against operating specifications. For users who print only one density level and a limited number of colors, a density history plot can be the density of a control strip patch plotted over time. For users who print many different density levels per color and many colors, the user can use the density error plot.

Figure 4:
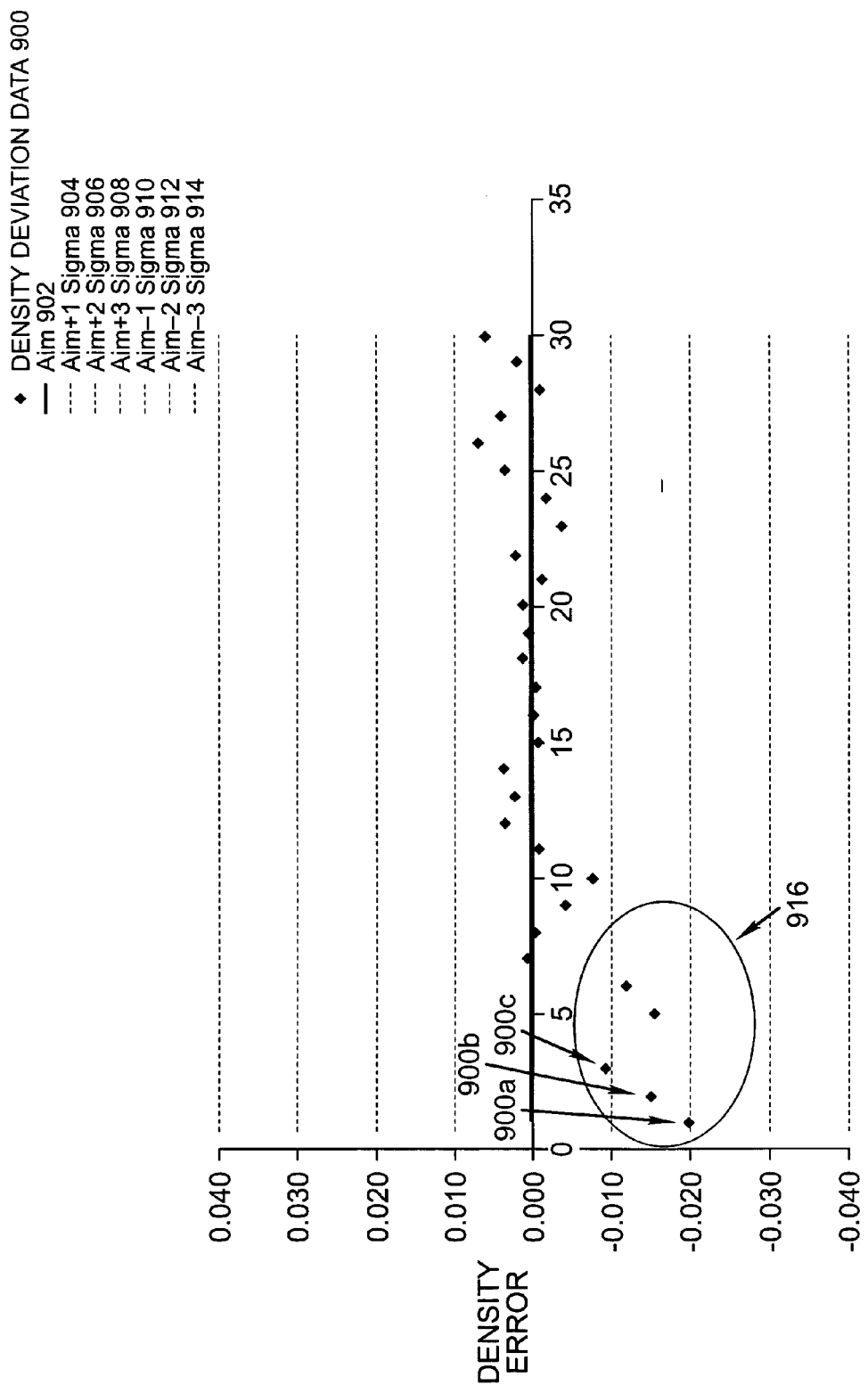
FIG. 4 is an example of a control chart for tracking the calibration performance of an imaging device.

FIG. 4 examples a density error plot with density error history 900. The density error history is compared against operating specifications 902, 904, 906, 908, 910, 912, and 914. The imaging device is considered in control if the following criteria are met: (1) a single data point 900a, 900b, and 900c does not exist beyond three standard deviation unit distances 908 and 914 from an average line 902; (2) two out of three data points 900a, 900b, and 900c do not exist on the same side of an average line 902 and not more than two standard deviation units 906 and 912 beyond the average line 902; (3) four out of five data points 900a, 900b, and 900c do not exist on the same side of an average line 902 and no more than one standard deviation unit 904 and 910 beyond the average line 902; and (4) eight out of nine data points 900a, 900b, and 900c do not exist on the same side of an average line 902. If the stated specifications are violated, the imaging device requires exposure calibration adjustment.

In FIG. 4, a group of data 916 has violated operations specifications rule (3), wherein four out of five data points 900a, 900b, and 900c do not exist on the same side of an average line 902 and no more than one standard deviation unit 904 and 910 beyond the average line 902. The detection of system drift can trigger an exposure calibration adjustment, the scheduling of an exposure calibration target, or combinations thereof.

The exposure calibration curve can be adjusted by subtracting the measured density error from the requested density. The resulting density can be used to calculate the calibrated exposure.

If the measured density error fails to meet operating specifications, a calibration target can be scheduled to run automatically. The calibration target can wait for the machine to become idle, thereby, reducing time a user spends on calibration.

If a user does not want to track the machine performance by measuring control strips, an alternate method is proposed to reduce calibration times and frequencies while maintaining calibration accuracy.

Returning to FIG. 3, the calibration curve is prepared by plotting exposure level versus density (Step 730). Individual density values 36a, 36b, and 36c are noted in FIG. 3. Calibration curve 38 represents a system that can have an adjustable density.

Once an exposure calibration curve has been calculated, a first calibration target can be scheduled to run automatically on an image processing apparatus. The schedule can be based on the thermal media availability as well as the image processing apparatus availability to minimize disruption to the user's workflow. A schedule for a second calibration target can be updated such that a second calibration target is automatically imaged.

The second calibration target can contain a subset of exposure data contained in the first calibration target. The second calibration target requires less time for imaging and measuring than the first calibration target. A second calibration target can consist of solid density patches for each solid color contained in a proof. A customer can measure the second calibration with a spectrophotometer, such as an X-Rite 508 series spectrophotometer. A software interface can be provided to collect reflectance spectrum data for the second calibration target.

Monitoring the second calibration target data history involves collecting second calibration target data over time for similar colors, creating a time based parameter plot, and checking the data history against operating specifications. The second calibration target can follow the same guidelines as the control strip density or deviation history, as exampled in FIG. 4.

If the measured density error fails to meet operating specifications a first or second calibration target can be scheduled to run automatically, the exposure calibration curve can be adjusted, or combinations thereof. The calibration target can wait for the machine to become idle therefore reducing time spent on calibration. The exposure calibration curve can be adjusted by subtracting the measured density error from the requested density, and then the resulting density can be used to calculate the calibrated exposure.

The embodiments have been described in detail with particular reference to certain embodiments thereof, but it will be understood that variations and modifications can be effected within the scope of the embodiments, especially to those skilled in the art.

PARTS LIST 36a density
36b density
36c density
38 calibration curve
38a toe exposure
38b polynomial
38c shoulder exposure
112 image processor housing
114 image processor door
115 media drive mechanism
116 media carousel
118a donor material
118b rollmedia
118c rollmedia
118c rollmedia
118d rollmedia
118e roll media
118f rollmedia
118g thermal print media
120 laser assembly
122 laser diodes
124 fiber optic cables
126 distribution block
128 printhead
130 vacuum imaging drum
132 donor ejection chute
134 donor waste bin
136 transport mechanism
137 exit tray
140 knife blade
142 knife blade

The invention claimed is:

1. A method for monitoring and adjusting the calibration for an image processing apparatus, wherein the method comprises the steps of:
   a. imaging a calibration target on a layered assembly using the image processing apparatus to create an image, wherein the layered assembly comprises a thermal donor on a thermal receiver;
   b. scanning the image into host software on the image processing apparatus, thereby forming an exposure calibration curve;

c. forming a schedule for the calibration target;
d. imaging a plurality of control strips using the image processing apparatus to create a plurality of control strip images, wherein each control strip comprises at least one calibrated density on a proof, and obtaining a calibrated density history for the control strips using the control strip images;
e. scanning control strip images into the host software on the image processing apparatus to obtain a scanned density history for each control strip, thereby forming a density history for the control strips;
f. calculating a deviation history by comparing the scanned density history to the calibrated density history for each control strip; and
g. monitoring the deviation history, wherein when the deviation history is outside operating specifications for the image processing apparatus, selecting a course of action selected from the group consisting of updating the schedule, adjusting the exposure calibration curve, and combinations thereof.

2. The method of claim 1, wherein the calibration target comprises a plurality of individual exposure levels for the image processing apparatus.

3. The method of claim 1, the step of imaging the calibration target is performed by an automated process.

4. The method of claim 3, wherein the automated process implements calibration based on the schedule.

5. The method of claim 1, wherein the exposure calibration curve comprises a look-up table of exposure values versus density for the image processing apparatus.

6. The method of claim 1, wherein each control strip is attached to the proof prior to imaging.

7. The method of claim 1, wherein the calibrated density history comprises a customer requested density plotted against time.

8. The method of claim 1, wherein the scanned density history is the actual density output for the image processing apparatus plotted over time.

9. The method of claim 1, wherein step of adjusting of the exposure calibration curve is performed using a member selected from the group consisting of the density history, a lookup table based on the deviation history, and combinations thereof.

10. The method of claim 1, wherein the schedule comprises:
a. dates and time for imaging the calibration target; and
b. an inventory of media for the image processing apparatus; and combinations thereof.

11. A method for monitoring the calibration for an image processing apparatus, wherein the method comprises the steps of:

a. imaging a first calibration target on a first layered assembly using the image processing apparatus to create a first calibration image;
b. scanning the first calibration image into host software on the image processing apparatus, thereby forming an exposure calibration curve;
c. forming a first schedule for imaging the first calibration target;
d. forming a second schedule for imaging a plurality of calibration targets;
e. imaging the calibration targets on a plurality of layered assemblies using the image processing apparatus to create a plurality of calibration images and a calibrated density history, wherein each layered assembly comprises a thermal donor on a thermal receiver;
f. scanning the calibration images into the host software on the image processing apparatus forming a scanned density history;
g. calculating a deviation history by comparing the scanned density history to the calibrated density history; and
h. monitoring the deviation history, wherein when the deviation history is outside operating specifications for the image processing apparatus, selecting a course of action selected from the group consisting of updating the first schedule, updating the second schedule, adjusting the exposure calibration curve, and combinations thereof.

12. The method of claim 11, wherein the exposure calibration curve comprises a look-up table of exposure values versus density for the image processing apparatus.

13. The method of claim 11, wherein the calibrated density history comprises a customer requested density plotted against time.

14. The method of claim 11, wherein the scanned density history is the actual density output for the image processing apparatus plotted over time.

15. The method of claim 11, wherein step of adjusting of the exposure calibration curve is performed using a member selected from the group consisting of the density history, a lookup table based on the deviation history, and combinations thereof.

16. The method of claim 11, wherein the first and second schedule each comprise:
a. dates and time for imaging the calibration target; and
b. an inventory of media for the image processing apparatus; and combinations thereof.

* * * * *